(No Model.)
H. C. BAKER & J. W. FREE.
APPARATUS FOR MALTING GRAIN.
No. 533,339. Patented Jan. 29, 1895.
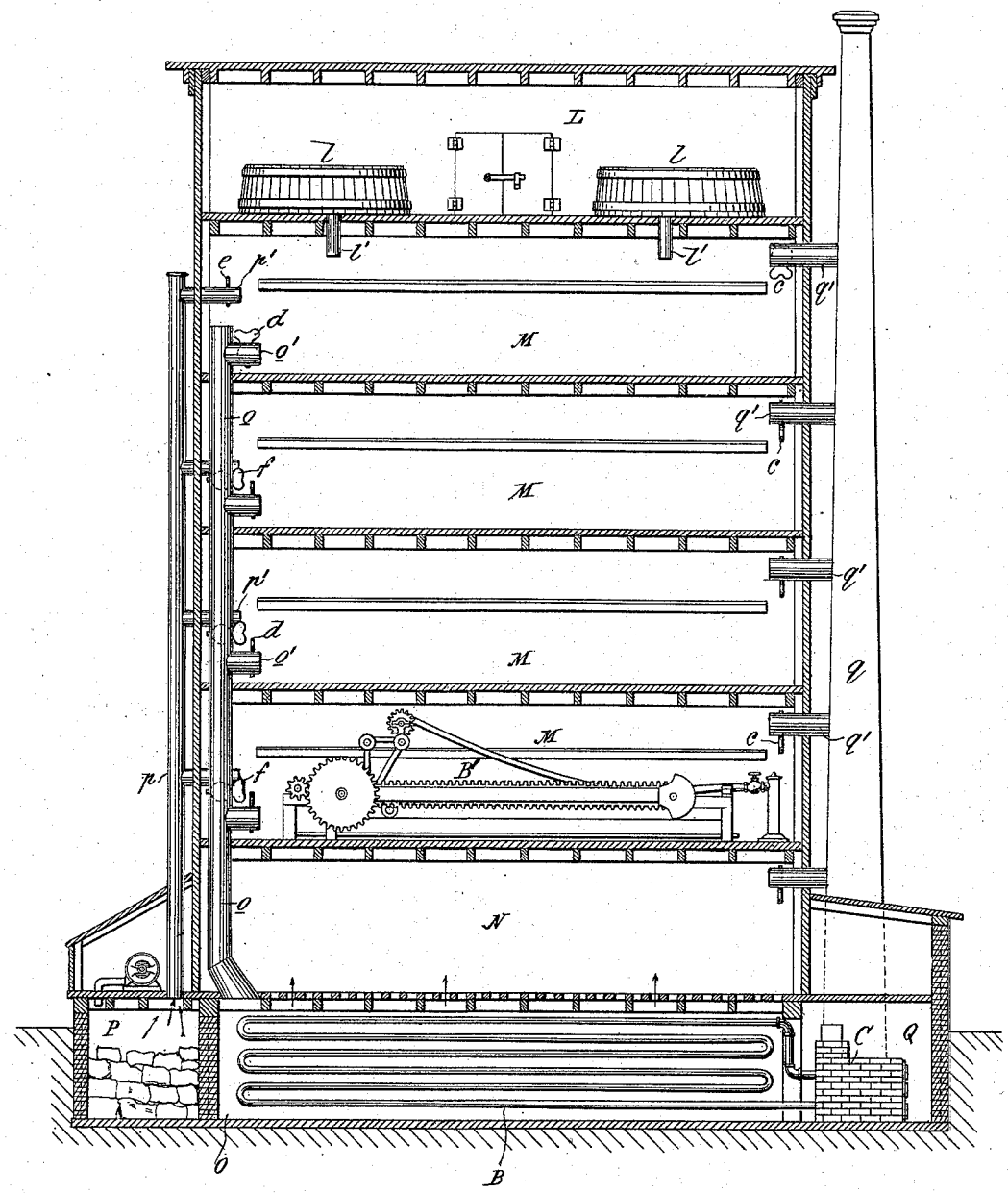
Witnesses:
Raphael Netter
James Catlow
Inventors
Hurbert C. Baker
John W. Free
by Duncan & Page
Attorneys

UNITED STATES PATENT OFFICE.

HURBERT C. BAKER, OF HARTFORD, CONNECTICUT, AND JOHN W. FREE, OF NEW YORK, N. Y.

APPARATUS FOR MALTING GRAIN.

SPECIFICATION forming part of Letters Patent No. 533,339, dated January 29, 1895.

Original application filed October 15, 1891, Serial No. 408,742. Divided and this application filed January 31, 1893. Serial No. 460,389. (No model.)

*To all whom it may concern:*

Be it known that we, HURBERT C. BAKER, of Hartford, in the county of Hartford and State of Connecticut, and JOHN W. FREE, of New York, in the county and State of New York, citizens of the United States, have invented certain new and useful Improvements in Apparatus for Malting Grain, of which the following is a specification, reference being had to the drawing accompanying and forming a part of the same.

The malting of grain is a process the duration of which, in any particular case, depends very largely upon the temperature of the atmosphere to which the grain is exposed, but the success of the process is largely dependent not only upon its duration but upon other conditions, such as the degree of humidity and purity of the atmosphere in which the germination and drying of the grain take place.

Recognizing the difficulties experienced in obtaining uniformly good results in the malting of grain we conceived the plan of producing artificially the ideal conditions which have been recognized among malsters, so as not only to secure a uniformity in the attendant conditions of each operation independently of the outside influences of humidity and temperature, but also in character of the product. We have, therefore, designed a malting house,—which may include a drying room or kiln, or, if not, then the same provisions are to be applied to the kiln also,— in connection with which we employ a source of cold air, and a source of warm air, with flues for conveying the same respectively from such sources and delivering it to the different portions of the house, and a system of ventilation. The supply of either cold or warm air, or both, is regulated both as to quantity and proportion by suitable devices for the purpose, and the ventilation is effected by a positive draft, so that the exact conditions of the air in the malting house generally, or in any chamber or compartment in which the malting process may be going on, may be readily ascertained and controlled.

In the present case, in illustration of our improvements, we have shown a malting house with a number of growing floors or compartments, including a drying floor, but it will be understood that the invention is applicable generally to any chamber, compartment or receptacle in which grain may be malted.

The figure shows a malt-house in vertical transverse section.

The grain to be malted is carried in any convenient manner to the upper floor L, where are located the soaking tubs *l* into which it is deposited in the desired quantities. Having been soaked in these to a sufficient extent, the grain is next run out through proper chutes, as *l'*, from the tubs into any one of the series of growing chambers M below. Each of these chambers M is provided with an apparatus B' for stirring the grain, but this is indicated in one of the chambers only. Any means or device may be employed for this, though we prefer to use a special apparatus designed by us for the purpose, and which is more fully described in our Patent No. 496,335, dated April 25, 1893. As the germination of malt takes a longer time than is required to soak it for germination, or to dry it after germination, three or more growing chambers are provided for one soaking chamber L, and one drying chamber N, and proper provision will in practice be made for conducting the grain from any of the upper floors to the desired floor below.

In the construction shown in the drawings the drying chamber N is below the growing chamber M, and the germinated grain from any of the growing chambers is to be conducted, as above described, to the drying chamber. Below the level of the drying chamber are a series of chambers or compartments O, P, Q. In one of these compartments, as Q, is located a furnace C, from which rises a chimney *q*. This chimney communicates by flues *q'* with the upper portion of each of the growing and drying chambers, and these flues *q'* are provided with shut-off valves or dampers *c*, as shown, by which they can be opened into or shut off from the interior of the chimney *q*.

In the chamber O is a bank of pipes B for steam or hot water heated by the furnace in the compartment Q, and air circulating among or forced up around the pipes is heated and made to pass up through the perforated floor of the drying chamber N to dry the malt in that chamber. A flue o also leads from the compartment O to the chambers M, with each of which connection is made through a branch o' entering said chambers near the floor. In each of said branches is a damper or valve d, by means of which the amount of warm air admitted to any one of said chambers may be controlled and regulated. Between each floor and in the flue o is also a shut-off valve f, by which the flue may be closed to the chamber above.

The compartment P is a refrigerating chamber and contains ice, or any means for artificially cooling the air. From this chamber rises a flue p which communicates by means of branches p' with the upper portion of each of the growing chambers M, and in each of which branches is a valve or damper e, as shown in the upper chamber M, the valves in the other chambers being concealed behind the flue o. By means of the valves d and e the amount or proportion of warm or cold air, or both, is or may be regulated thus permitting the operator to maintain the temperature of the growing chambers at any desired degree, while the branch flues connecting with the chimney q allow the air in these chambers to be constantly drawn off and thus prevented from injuring the malt, which it would do if it were allowed to remain in contact with it without ventilation.

The flues for conveying the hot and cold air to the growing chambers are closed at their upper ends, and it will be understood that any suitable apparatus may be employed to create a forced draft of either. The presence of the adjustable valves or dampers serves to check and modify the draft through the flues and to distribute the air which the flues deliver equally to the different chambers. It will also be understood that the purpose of connecting the ventilating branches with the chimney is to take advantage of the draft therein, and that any other similar flue with special means for creating a draft therein may be substituted for this.

In lieu of the specific devices herein shown and described for accomplishing the objects of this invention any other equivalent means for the same purpose may be employed, the invention not being limited in this respect.

The take-up or draft flue q should be connected with both the growing and the drying chambers, but no connection need be made between the hot and cold air flues and the drying chamber.

The special devices for stirring the grain in the growing and drying chambers is not herein described, the same having been made the subject of our aforesaid patent, of which the present application is a division.

Having now described our invention, what we claim is—

1. The combination with the malting chambers, of an air heater, an air cooler, an air flue leading from the said heater to the malting chambers, another air flue leading from the said cooler to the malting chambers, a ventilating flue, and controlling valves whereby either heated or cooled air may be admitted to any one of the said chambers independently of every other one, substantially as described.

2. The combination with the malting chambers, of a hot air flue o with branches entering the lower portion of each chamber, the cold air flue p with branches entering the upper portion of each chamber, the draft or take-up flue q with branches from the upper portion of each chamber, and controlling valves or dampers in each of the branches of the several flues, as set forth.

HURBERT C. BAKER.
JOHN W. FREE.

Witnesses for Baker:
  DAVIS RICH,
  ARTHUR H. BRONSON.
Witnesses for Free:
  ROBT. F. GAYLORD,
  RAPHAËL NETTEES.